Patented Aug. 8, 1950

2,517,613

UNITED STATES PATENT OFFICE 2,517,613

ACID DYESTUFFS OF THE ANTHRAQUINONE SERIES AND A PROCESS OF MAKING SAME

Samuel von Allmen and Hans Eggenberger, Basel, Switzerland, assignors to Sandoz Limited, Basel, Switzerland No Drawing. Application July 5, 1947, Serial No. 759,293. In Switzerland July 5, 1946

8 Claims. (Cl. 260—371)

The present invention relates to new dyestuffs of the anthraquinone series which give very brilliant shades and to a process for their manufacture.

It has been found that new acid dyestuffs of the anthraquinone series can be prepared by condensing amino-anthraquinone compounds of the general formula

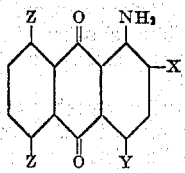

wherein X stands for chlorine, bromine or a sulfonic acid group, Y stands for chlorine or bromine, and one of the Z's stands for $SO_3H$, the other Z being hydrogen, with hydroaromatic amines of the general formula

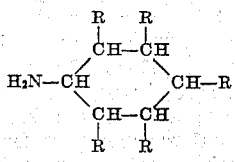

wherein R stands for hydrogen, alkyl or aralkyl radicals and when two R's stand in adjacent positions to each other, they may represent a ring-closing butyl or butylene group, the other R being hydrogen. In the case where X stands for chlorine or bromine, this halogen atom will be replaced by a sulfonic acid group by treating the resultant intermediate condensation products with an alkali metal sulfite.

As hydroaromatic amines that can be used according to the present invention the following may be cited: 1-aminocyclohexane, 1-amino-2-, -3- and -4-monoalkylcyclohexane, 1-amino-2:3- dialkylcyclohexane, 1 - amino-2:4-dialkylcyclohexane, 1-amino-2:5-dialkylcyclohexane, 1-amino-2:6-dialkylcyclohexane, 1-amino-3:4-dialkylcyclohexane, 1-amino-3:5-dialkylcyclohexane, 1-amino-2:3:4-trialkylcyclohexane, 1-amino-2:3:5-trialkylcyclohexane, 1-amino-2:3:6-trialkylcyclohexane, 1-amino-2:4:5-trialkylcyclohexane, 1-amino-2:4:6-trialkylcyclohexane, 1-amino-3:4:5-trialkylcyclohexane, wherein "alkyl" stands for methyl or ethyl groups; further 1-amino-3-methyl - 4 - benzyl - cyclohexane, 1 - amino - 3 - methyl-5-benzylcyclohexane, 1-amino-3:4- or 3:5-dibenzylcyclohexane, 1-amino- or 2-aminotetra- or -decahydronaphthalene and so on.

The condensation of the anthraquinone compounds with the hydroaromatic amines is carried out at temperatures ranging between 30° and 100° C. preferably in presence of copper or copper-salts at catalyst and of diluting agents and, in some cases, in an inert atmosphere. As diluting agents one can use an excess of the hydroaromatic amine itself or water or organic solvents, like methanol, ethanol or mixtures thereof.

The isolation of the condensation products is carried out by the usual methods and presents no special difficulties.

The new dyestuffs obtained according to this process possess, as compared to the known dyestuffs described in U. S. Patent No. 1,821,043, much better levelling properties and better fastness to light, perspiration, washing and milling.

The following examples, without being limitative, illustrate the present invention, the parts being by weight.

Example 1

12.5 parts of the sodium salt of 1-amino-4-bromanthraquinone-2:8-disulfonic acid containing 1.7 parts of sodium sulfate, 6 parts of aminocyclohexane, 4 parts of caustic soda lye 30 per cent, 0.2 part of copper powder and 80 parts of water are heated to 50° C. with stirring for 2 hours. The reaction mass becomes blue colored. The new dyestuff is isolated in the usual manner and is, in dry state, a blue powder being easily soluble in cold water with a brilliant greenish blue shade. It dissolves in concentrated sulfuric acid nearly colorless; this solution becomes reddish-blue on addition of some para-formaldehyde.

This dyestuff dyes animal fibres, like wool, silk and synthetical fibres, such as nylon, in brilliant pure blue shades of good fastness to light and wet-treatments. It possesses good levelling properties.

The condensation can be carried out in an inert atmosphere and the quantities of the amine, alkali and water can be varied in wide limits.

A similar dyestuff will be obtained, when the potassium salt of 1 - amino - 4 - bromanthraquinone-2:5-disulfonic acid is used.

Example 2

11 parts of the sodium salt of 1-amino-4-chloranthraquinone-2:5-disulfonic acid, 20 parts of 1-amino-4-methylcyclohexane, 4 parts of caustic soda lye 30 per cent, 0.2 part of copper powder, 0.1 part of cuprous chloride and 80 parts of water are stirred in a nitrogen atmosphere for 16 hours at 60-70° C. After the reaction is finished, the dyestuff is isolated in the usual manner and possesses similar properties to the dyestuff of Example 1.

Instead of the base used one can use 1-amino-4-ethyl-cyclohexane or the respective isomers containing the methyl- or ethyl group in 2- or 3-position.

Example 3

By replacing in Example 1 the 6 parts of aminocyclohexane by 10 parts of 1-amino-2:4-diethylcyclohexane or its isomers or the respective dimethyl derivatives, similar dyestuffs possessing similar fastness properties will be obtained.

Example 4

10.4 parts of the potassium salt of 1-amino-2:4 - dibromanthraquinone - 5 - sulfonic acid, 20 parts of 1-amino-2:4:6-trimethylcyclohexane, 4 parts of caustic soda lye 30 per cent, 0.3 part of copper powder and 120 parts of water are stirred in a nitrogen atmosphere for 24 hours at 60–70° C. After the reaction is finished, the dyestuff is isolated in the usual manner and the bromine atom present in 2-position replaced by a sulfonic acid group by heating the condensation product with an alkali metal sulfite under pressure.

Instead of the amine used in this example its isomers can be employed, thus producing dyestuffs possessing similar fastness properties.

Example 5

12.5 parts of the potassium salt of 1-amino-4-bromanthraquinone-2:5-disulfonic acid containing 1.7 parts of sodium sulfate, 12 parts of 1-amino-3:4-dimethylcyclohexane, 4 parts of caustic soda lye 30 per cent, 0.2 part of copper powder, 20 parts of ethanol and 80 parts of water are stirred at 55–60° C., until the reaction mass becomes pure blue colored. The condensation product thus obtained is isolated in the usual manner. In dry state it is a blue powder being easily soluble in cold water with a brilliant greenish-blue shade. Its solution in concentrated sulfuric acid is nearly colorless, but becomes on addition of some paraformaldehyde reddish-blue. The new dyestuff dyes animal fibres and nylon in brilliant pure blue shades of good fastness to light and to wet treatments and possesses good levelling properties. The condensation can also be carried out in an inert atmosphere.

Similar dyestuffs will be obtained when, instead of the amine used above, amines like 1-amino-3:5-dimethylcyclohexane, 1-amino-3:4-diethylcyclohexane, 1-amino-3:4-methylethylcyclohexane are used.

Instead of the anthraquinone compound used above its isomer, i. e. the 1-amino-4-bromanthraquinone-2:8-disulfonic acid, can be used, whereby dyestuffs possessing similar fastness properties will be obtained.

Example 6

12.5 parts of the potassium salt of 1-amino-4-bromanthraquinone-2:5-disulfonic acid containing 1.7 parts of sodium sulfate, 20 parts of 1-amino-3:4:5-trimethylcyclohexane, 4 parts of caustic soda lye 30 per cent, 0.2 part of copper powder, 20 parts of ethanol and 80 parts of water are stirred at 55–60° C. until the reaction mass becomes pure blue. The condensation product thus obtained is isolated in the usual manner. In dry state it is a blue powder being easily soluble in cold water with a brilliant greenish-blue shade. Its solution in concentrated sulfuric acid is pale yellow, but becomes reddish-blue on addition of some paraformaldehyde.

The new dyestuff dyes animal fibres and nylon in brilliant pure blue shades of good fastness properties to light and to wet treatment and possesses good levelling properties. The condensation can also be carried out in an inert atmosphere.

Similar dyestuffs will be obtained, when the anthraquinone compound used above is replaced by its 2:8-disulfonic isomer, while instead of the amine used above the respective isomers or the ethyl derivatives are used.

Example 7

22.5 parts of the potassium salt of 1-amino-4-bromanthraquinone-2:8-disulfonic acid containing 1 part of sodium sulfate, 25 parts of 2-amino-1:2:3:4-tetrahydronaphthalene, 8 parts of caustic soda lye 30 per cent, 0.4 part of copper powder, 60 parts of ethanol and 240 parts of water are stirred at 60–70° C. until the charge becomes a pure blue color. The condensation product thus obtained is isolated in the usual manner. In dry state it is a blue powder being easily soluble in cold water with a brilliant greenish-blue shade. Its solution in concentrated sulfuric acid is nearly colorless, but becomes reddish-blue on addition of some para-formaldehyde.

The new dyestuff dyes animal fibres and nylon in brilliant pure blue shades of good fastness to light and to wet treatments and possesses good levelling properties.

Identical or similar dyestuffs will be obtained when the potassium salt of 1-amino-4-bromanthraquinone-2:8-disulfonic acid is replaced by another salt or by the free acid or by the isomer containing the sulfonic groups in 2:5-position.

Example 8

20 parts of the sodium salt of 1-amino-bromanthraquinone-2:5-disulfonic acid, 25 parts of 1-amino-1:2:3:4-tetrahydronaphthalene, 10 parts of caustic soda lye 30 per cent and 240 parts of water are stirred at 60–70° C., until the color of the reaction product turns to a pure blue. The condensation product thus obtained is then isolated in the usual manner. In dry state it is a blue powder being easily soluble in cold water with a brilliant greenish-blue shade. Its solution in conc. sulfuric acid is colorless, but becomes reddish-blue on addition of some para-formaldehyde. The new dyestuff dyes animal fibres and nylon in brilliant pure blue shades possessing good fastness to light and to wet treatments and possesses good levelling properties.

Instead of the amine used above one can use 1- or 2-amino-decahydronaphthalene, whereby dyestuffs possessing similar properties will be obtained.

The disulfonic acids used in the above examples can be replaced by the 2:4-dihalogenomonosulfonic acids; in such cases it will be necessary, in order to prepare identical dyestuffs to subject the condensation products primary obtained to a treatment with an alkali metal sulfite.

What we claim is:

1. A process for the manufacture of a new acid dyestuff of the anthraquinone series comprising the step of condensing 1-amino-4-bromanthraquinone-2:8-disulfonic acid with aminocyclohexane in presence of an acid binding agent, copper as catalyst and a diluent.

2. A process for the manufacture of a new acid dyestuff of the anthraquinone series comprising the step of condensing 1-amino-4-bromanthraquinone-2:5-disulfonic acid with 1-amino-3:4-dimethylcyclohexane in presence of an acid binding agent, copper as catalyst and a diluent.

3. A process for the manufacture of a new acid dyestuff of the anthraquinone series comprising the step of condensing 1-amino-4-bromanthraquinone-2:8-disulfonic acid with 2-amino-1:2:3:4-tetrahydronaphthalene in presence of an acid binding agent, copper as catalyst and a diluent.

4. The anthraquinone dyestuff of the formula

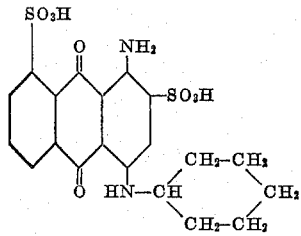

5. The anthraquinone dyestuff of the formula

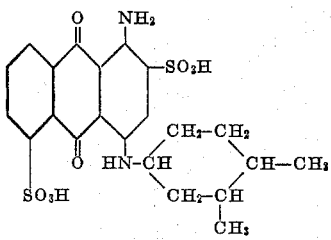

6. The anthraquinone dyestuff of the formula

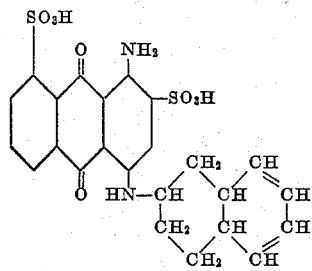

7. A process for the manufacture of new acid dyestuffs of the anthraquinone series comprising the step of condensing anthraquinone compounds of the general formula

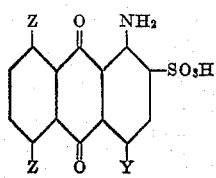

wherein Y stands for a substituent selected from the group consisting of chlorine and bromine and wherein one of the Z's stands for a sulfonic acid group, the other Z being hydrogen, with hydroaromatic amines of the general formula

wherein R stands for a member selected from the group consisting of hexahydrophenyl, hexahydrotolyl, hexahydroethylphenyl, hexahydroxylyl, hexahydrodiethylphenyl, hexahydrodimethylphenyl, hexahydrodiphenyl, hexahydrobenzylphenyl, ac-tetrahydronaphthyl and decahydronaphthyl, in presence of an acid binding agent, of copper as catalyst and of a diluent.

8. As new articles of manufacture the acid anthraquinone dyestuffs of the general formula

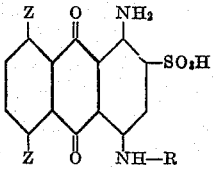

wherein one of the Z's stands for a sulfonic acid group, the other Z being hydrogen and wherein R stands for a member selected from the group consisting of hexahydrophenyl, hexahydrotolyl, hexahydroethylphenyl, hexahydroxylyl, hexahydrodiethylphenyl, hexahydrodimethylphenyl, hexahydrodiphenyl, hexahydrobenzylphenyl, ac-tetrahydronaphthyl and decahydronaphthyl.

SAMUEL von ALLMEN.
HANS EGGENBERGER.

REFERENCES CITED

The following references are of record in the file of this patent:

UNITED STATES PATENTS

| Number | Name | Date |
|---|---|---|
| 1,821,943 | Weinand | Sept. 1, 1931 |
| 1,843,308 | Weinand | Feb. 2, 1932 |
| 1,885,065 | Von Allmen | Oct. 25, 1932 |
| 1,898,861 | Von Allmen | Feb. 21, 1933 |
| 2,042,757 | Zahn et al. | June 2, 1936 |
| 2,453,285 | Von Allmen et al. | Nov. 9, 1948 |

FOREIGN PATENTS

| Number | Country | Date |
|---|---|---|
| 462,694 | Great Britain | Mar. 15, 1937 |